United States Patent
Partouche et al.

(10) Patent No.: US 9,648,271 B2
(45) Date of Patent: May 9, 2017

(54) SYSTEM FOR FILMING A VIDEO MOVIE

(71) Applicant: SOLIDANIM, Ivry sur Seine (FR)

(72) Inventors: Isaac Partouche, Nogent sur Marne (FR); Jean-François Szlapka, Les Lilas (FR); Emmanuel Linot, Montlouis-sur-Loire (FR)

(73) Assignee: SOLIDANIM, Ivry sur Seine (FR)

( * ) Notice: Subject to any disclaimer, the term of this patent is extended or adjusted under 35 U.S.C. 154(b) by 0 days.

(21) Appl. No.: 14/364,844

(22) PCT Filed: Dec. 13, 2012

(86) PCT No.: PCT/FR2012/052916
§ 371 (c)(1),
(2) Date: Aug. 27, 2014

(87) PCT Pub. No.: WO2013/088076
PCT Pub. Date: Jun. 20, 2013

(65) Prior Publication Data
US 2014/0369661 A1 Dec. 18, 2014

(30) Foreign Application Priority Data

Dec. 13, 2011 (FR) .................................. 11 61535

(51) Int. Cl.
*H04N 5/77* (2006.01)
*G06T 13/20* (2011.01)
(Continued)

(52) U.S. Cl.
CPC ............... *H04N 5/77* (2013.01); *G06T 13/20* (2013.01); *G06T 19/006* (2013.01);
(Continued)

(58) Field of Classification Search
CPC ................................ H04N 5/2228; G06T 7/00
(Continued)

(56) References Cited

U.S. PATENT DOCUMENTS

| 5,991,085 A | 11/1999 | Rallison et al. |
| 6,922,632 B2 | 7/2005 | Foxlin |

(Continued)

FOREIGN PATENT DOCUMENTS

| EP | 1 349 382 A2 | 10/2003 |
| EP | 1 852 828 A2 | 11/2007 |

(Continued)

OTHER PUBLICATIONS

Klein et al., "Parallel Tracking and Mapping for Small AR Workspaces", 10 pages, 2007.
(Continued)

*Primary Examiner* — Hung Dang
*Assistant Examiner* — Girumsew Wendmagegn
(74) *Attorney, Agent, or Firm* — Orrick Herrington & Sutcliffe, LLP

(57) ABSTRACT

System for filming a video movie in a real space comprising: —a filming camera (9), —a sensor (16), —a computerized pinpointing module (27) for determining the location of the filming camera, —a monitoring screen (15), —a computerized compositing module (32) for generating on the monitoring screen (15) a composite image of the real image and of a projection of a virtual image, generated according to the filming camera (9) location data.

1 Claim, 7 Drawing Sheets

Figure 1:
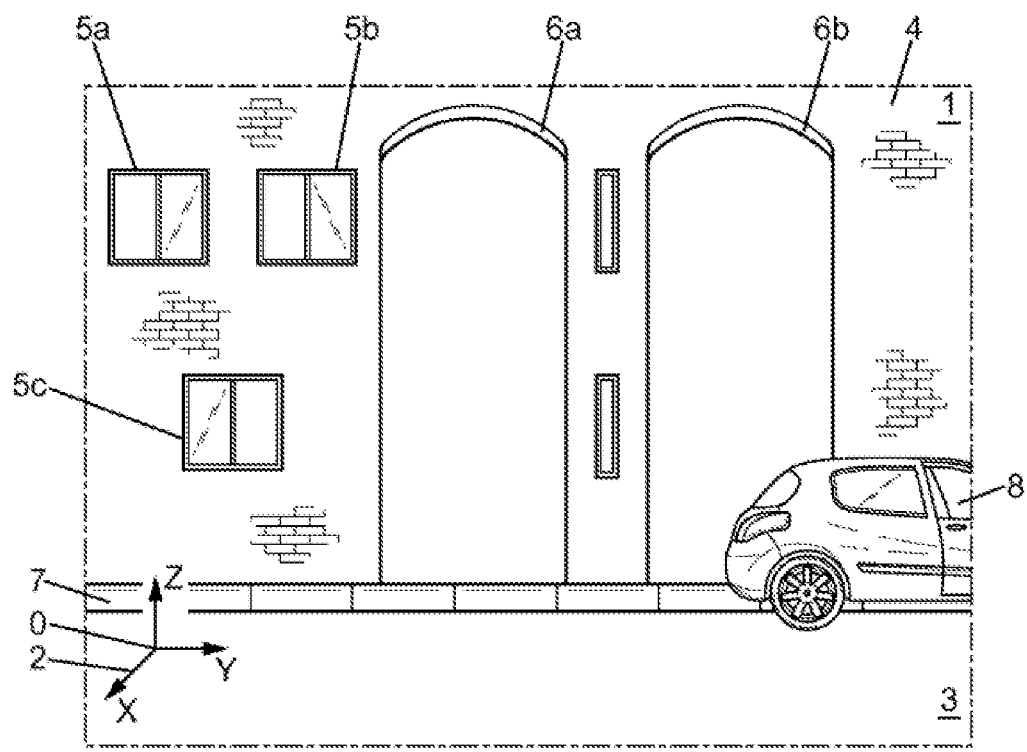

(51) Int. Cl.
| | |
|---|---|
| *H04N 9/87* | (2006.01) |
| *G06T 19/00* | (2011.01) |
| *H04N 5/222* | (2006.01) |
| *G11B 31/00* | (2006.01) |
| *H04N 17/00* | (2006.01) |

(52) U.S. Cl.
CPC ......... *G11B 31/006* (2013.01); *H04N 5/2224* (2013.01); *H04N 9/8715* (2013.01); *H04N 17/002* (2013.01)

(58) Field of Classification Search
USPC .......................................................... 386/227
See application file for complete search history.

(56) References Cited

U.S. PATENT DOCUMENTS

| | | | |
|---|---|---|---|
| 2004/0028258 | A1 | 2/2004 | Foxlin et al. |
| 2004/0056870 | A1 | 3/2004 | Shimoyama et al. |
| 2004/0212630 | A1 | 10/2004 | Hobgood et al. |
| 2005/0100134 | A1 | 5/2005 | Bauer et al. |
| 2005/0190972 | A1 | 9/2005 | Thomas et al. |
| 2005/0275722 | A1 | 12/2005 | Evers-Senne et al. |
| 2006/0044327 | A1 | 3/2006 | Okuno et al. |
| 2007/0248283 | A1* | 10/2007 | Mack .................... G06T 19/006 382/284 |
| 2008/0266386 | A1 | 10/2008 | Maeda |
| 2009/0066696 | A1 | 3/2009 | Williams |
| 2009/0232353 | A1 | 9/2009 | Sundaresan et al. |
| 2009/0262217 | A1 | 10/2009 | Mack et al. |
| 2010/0045701 | A1 | 2/2010 | Scott et al. |
| 2011/0234631 | A1* | 9/2011 | Kim ....................... G06T 15/60 345/632 |
| 2011/0249095 | A1 | 10/2011 | Kim et al. |
| 2012/0002014 | A1 | 1/2012 | Walsh |
| 2013/0201291 | A1 | 8/2013 | Liu et al. |

FOREIGN PATENT DOCUMENTS

| | | |
|---|---|---|
| GB | 2465791 A | 6/2010 |
| GB | 2466714 A | 7/2010 |
| GB | 2503563 A | 1/2014 |
| JP | 10-051711 A | 2/1998 |
| JP | 2005-100134 A | 4/2005 |
| JP | 2008-15576 A | 1/2008 |
| WO | WO 2011/014340 A2 | 2/2011 |
| WO | 2011/118903 | 9/2011 |
| WO | WO 2013/167901 A1 | 11/2013 |

OTHER PUBLICATIONS

Newcombe et al., "DTAM: Dense Tracking and Mapping in Real-Time", 8 pages, 2011.

FR, International Search Report and Written Opinion, Appln. PCT/FR2012/052916, Dec. 13, 2012.

FR, International Written Opinion, Appln. No. 1161535, Dec. 13, 2011.

FR, Preliminary Search Report, Appln. No. 1161535, Jun. 14, 2012.

Galvin, Feature: Going Hollywood, Professional Surveyor Magazine, Feb. 2011, 4 pages.

Global GPS Tracking added to Previzion VFX System, CreativeCOW.net, Jul. 2011, 2 pages.

Previzion User Manual, Lightcraft Technology, Date, Feb. 2011, 210 pages.

New Products & Services, The American Society of Cinematographers, Aug. 2011, 12 pages.

China, First office action, issued in connection with application No. 201280062324.7, Apr. 8, 2016.

EP, Summons to oral proceedings and attached comment, issued in connection with EP application No. 12813918.5. [translation provided by Google Translate], May 23, 2016.

EP, Third Party Observations under Article 115 EPC and Rule 114 EPC, issued in connection with EP application No. 12813918.5, Apr. 25, 2016.

Study of critical techniques in a virtual studio prototype system, Lili Wand, Database for Chinese Excellent Master and Doctor Thesis, vol. 1, pp. 5-30.

J. Chandaria et. al., "Real-Time Camera Tracking in the MATRIS Project", BBC Research White Paper 147, Feb. 2007.

J. Chandaria et. al., "Real-Time Camera Tracking in the MATRIS Project", 2006.

J. Chandaria et. al., "The MATRIS project: real-time markerless camera tracking for Augmented Reality and broadcast applications", 2007.

J. Chandaria et. al., "A Chronology of Interpolation: From Ancient Astronomy to Modem Signal and Image Processing", 2002.

J. Chandaria et. al., "Real-time vision-based tracking and reconstruction", 2007.

B. Streckel et al., "Lens Model Selection for Visual Tracking", 2005.

LeParisien, L'innovation qui révolutionne le cinema, Mar. 28, 2013.

Japanese Application No. 2014-546616, Notice of Reasons for Rejection, Aug. 22, 2016.

Takizawa, Tomomi, et al., "Composition of Moving CG Human Body Model and Real Video Image," Technical Report of the Information Processing Society of Japan, 99(43), May 21, 1999; Humanities and Computer 42-6, pp. 39-46, ISSN 0919-6072.

European Search Report dated Feb. 15, 2017 for 12 813 918.5, Aug. 22, 2016.

Chandaria, Jigna, et al., "The MATRIS project, real-time markerless camera tracking for Augmented Reality and broadcast applications" Journal of Real-Time Image Processing, vol. 2, No. 2-3, Oct. 18, 2007, pp. 69-79.

Koeser, Kevin, et al., "Robust GPU-assisted camera tracking using free-form surface models," Journal of Real-Time Image Processing, vol. 2, No. 2-3, Oct. 23, 2007, pp. 133-147.

* cited by examiner

SYSTEM FOR FILMING A VIDEO MOVIE

The present invention relates to systems for filming video footage.

The ability to film video footage has existed for a long time. In recent decades, it has become increasingly common to use augmented reality in broadcast or distributed videos, to represent objects or events that would be difficult to film in the real world.

A conventional method for constructing video footage containing such an augmented reality sequence starts with filming the actors in a neutral calibrated environment, such as in a studio against a monochrome background. A few weeks or months later, three-dimensional animations are added during post-production to give the illusion they are interacting with the filmed actor.

It is difficult for actors and directors to act or shoot a realistic scene in a studio with a monochrome background. As a result, a previewing system has recently been proposed where a preliminary version of the animation is generated and is shown to the director and the actors before the scene is enacted. The actors and directors can then more easily imagine their virtual environment and/or the acting of their virtual alter ego.

These systems are still inadequate, however, and many adjustments still need to be made in post-production to adapt the animations to the recorded movie which is completely unchangeable at this point.

Also known are systems using calibrated markers to try to provide a better idea of where the camera is during shooting. A system sold under the name Lightcraft is one example. These systems are very laborious to implement because they require equipping the studio with markers, a complex operation, and they are also limited to use in the studio or in spaces of limited extent where the markers are placed.

The present invention is intended to overcome these disadvantages.

For this purpose, a system is proposed for filming video footage in a real space defined in a real reference system, comprising:
- a filming camera, suitable for recording a real image for a plurality of discrete time frames,
- a location pinpointing system, comprising:
  - at least one sensor, provided with location data relative to the filming camera that are known for each time frame, and suitable for transmitting to a computerized pinpointing module the natural topographical information detected by the sensor,
  - a computerized pinpointing module suitable for determining, for each time frame, the filming camera location data in the real reference system based on location data of the sensor, and on a comparison of the natural topographical information and a predetermined three-dimensional model of the real space,
- a monitoring screen,
- a computerized compositing module suitable for generating on the monitoring screen, for each time frame, a composite image of the real image and of a projection of a virtual image taken from a database of virtual animations, said projection generated according to the filming camera location data in the real reference system.

The display on the monitoring screen is generated almost instantaneously, for example within a second, including the possible processing time and latency due to the various system components.

With these arrangements, the interactions between the real world and the virtual world can be viewed directly on the monitoring screen while filming. This allows reshooting the same scene when necessary, until it is satisfactory.

By using the natural topographical information, the above problems concerning markers are eliminated. This provides more freedom when filming.

In preferred embodiments of the invention, one or more of the following arrangements may optionally be used:
- the sensor of the pinpointing system is an optical camera having at least one of the following characteristics:
  - a solid angle of view that is greater than a solid angle of view of the filming camera,
  - an acquisition frequency that is greater than an acquisition frequency of the filming camera,
  - an acquisition in black and white,
  - a bulk at least two times smaller than the bulk of the filming camera;
  - an optical axis parallel to an optical axis of the filming camera,
  - a field of view superimposed over a field of view of the filming camera;
- the pinpointing system comprises computerized generation module suitable for generating said predetermined three-dimensional model of the real space, and said sensor is suitable for transmitting to the computerized generation module topographical information detected by the sensor;
- the sensor is suitable for simultaneously transmitting to the computerized pinpointing module and computerized generation module natural topographical information detected by the sensor, and the computerized generation module is suitable for enriching said predetermined three-dimensional model of the real space using natural topographical information detected by the sensor;
- the topographical information comprises information relating to geometric objects of the real space that are chosen from among points, lines, surfaces, and volumes;
- in the filming configuration, the filming camera and the sensor are fixedly attached to each other;
- the system further comprises a positioning system comprising a positioning pattern suitable for simultaneous detection by the filming camera and by the sensor in a positioning configuration, and a computer positioning module suitable for determining the respective location data of the sensor and of the filming camera from their simultaneous detection of the positioning pattern;
- the system further comprises an optical calibration system comprising an optical calibration pattern suitable for detection by the filming camera, in an optical calibration configuration, and the computerized pinpointing module is suitable for determining, for each time frame, the filming camera location data in the real reference system based in addition on optical calibration data of the filming camera that are determined by the optical calibration system;
- the system further comprises at least one of the following entities:
  - an inertial sensor fixed to the filming camera, suitable for determining a movement of the filming camera, the computerized pinpointing module being suitable for determining the filming camera location data in the real reference system based in addition from data supplied by the inertial sensor;

a measurement reference, filmable by the filming camera, the computerized compositing module being able to bring a virtual image to the scale of the real space based on an image of the measurement reference captured by the filming camera;

a system for determining a magnification setting for the filming, camera, the computerized compositing module being suitable for generating the composite image by taking into account said parameter;

the system further comprises a computerized animation module comprising a database of virtual animations, each animation comprising, for each of a set of time frames, a three-dimensional image expressed in a virtual reference system, the computerized animation module being suitable for transmitting said three-dimensional images to the compositing module;

the computerized pinpointing module is suitable for transmitting the predetermined three-dimensional model of the real space to the computerized animation module;

the computerized compositing module is suitable for generating a shadow of the virtual image on the monitoring screen, for each time frame, said shadow being generated according to the filming camera location data in the real reference system and lighting location data in the real reference system.

for a Later time frame, the computerized pinpointing module is able to determine the filming camera location data in the real reference system based in addition on the filming camera location data in the real reference system for an earlier time frame;

the computerized pinpointing module comprises selection module suitable for selecting, from among the geometric patterns, geometric patterns of the three-dimensional model that are usable for locating the position of the filming camera in 3D space;

the selection module compares geometric patterns of a later image with geometric patterns of an earlier image, associates geometric patterns present in both images and unmoving in the real space, and does not keep the other geometric patterns for comparison with the three-dimensional model;

the pinpointing system further comprises a second sensor having at least one characteristic that is different from the first sensor, chosen from among the position, the orientation, the solid angle of view, the acquisition frequency, the optical axis, and the field of view.

In certain embodiments, a sensor can be used that is dedicated to pinpointing the position and is optimized to do so, which allows the camera to focus exclusively on its primary function of filming.

Other features and advantages of the invention will become apparent from the following description of one of its embodiments, given by way of non-limiting example, with reference to the accompanying drawings.

Figure 2:
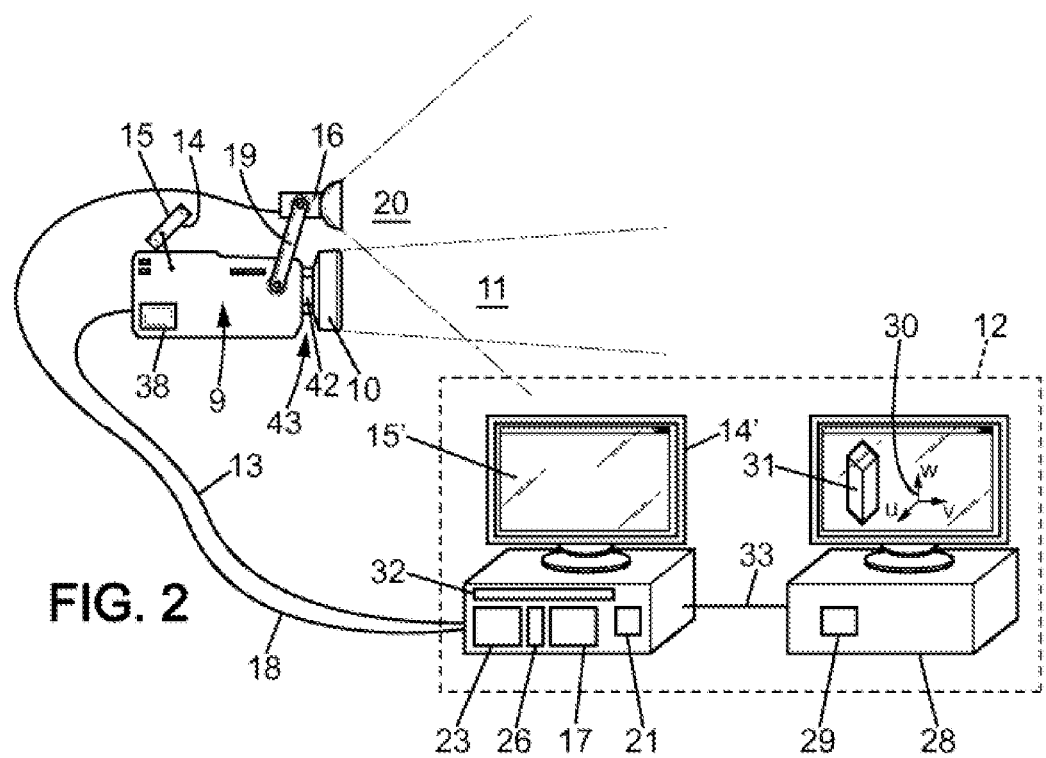
Figure 3:
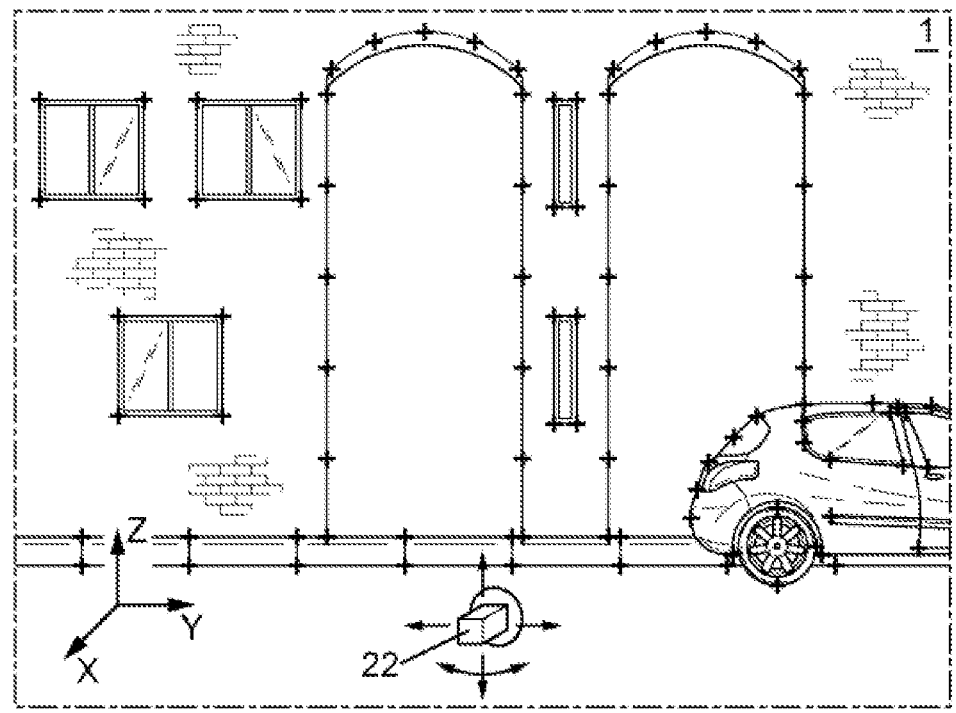
Figure 5:
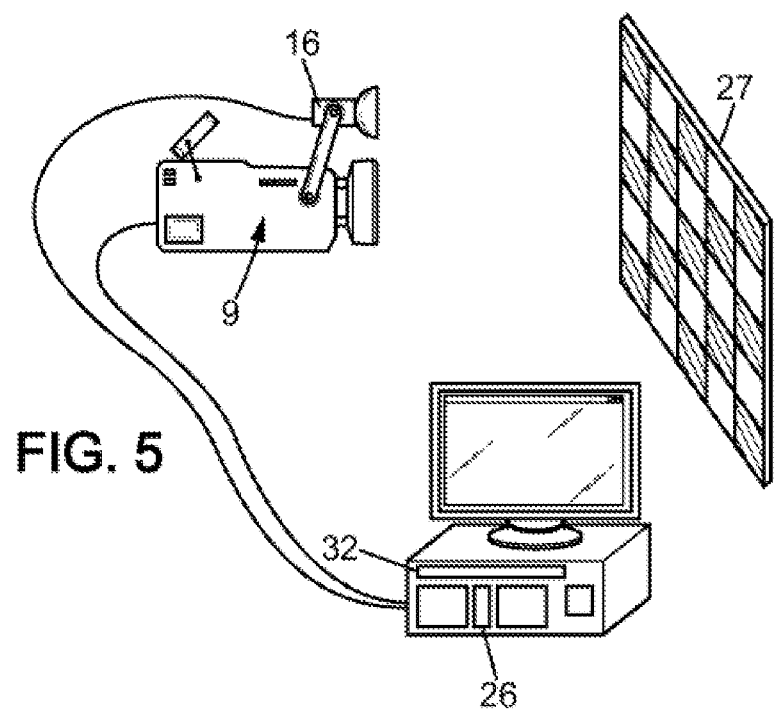
Figure 4:
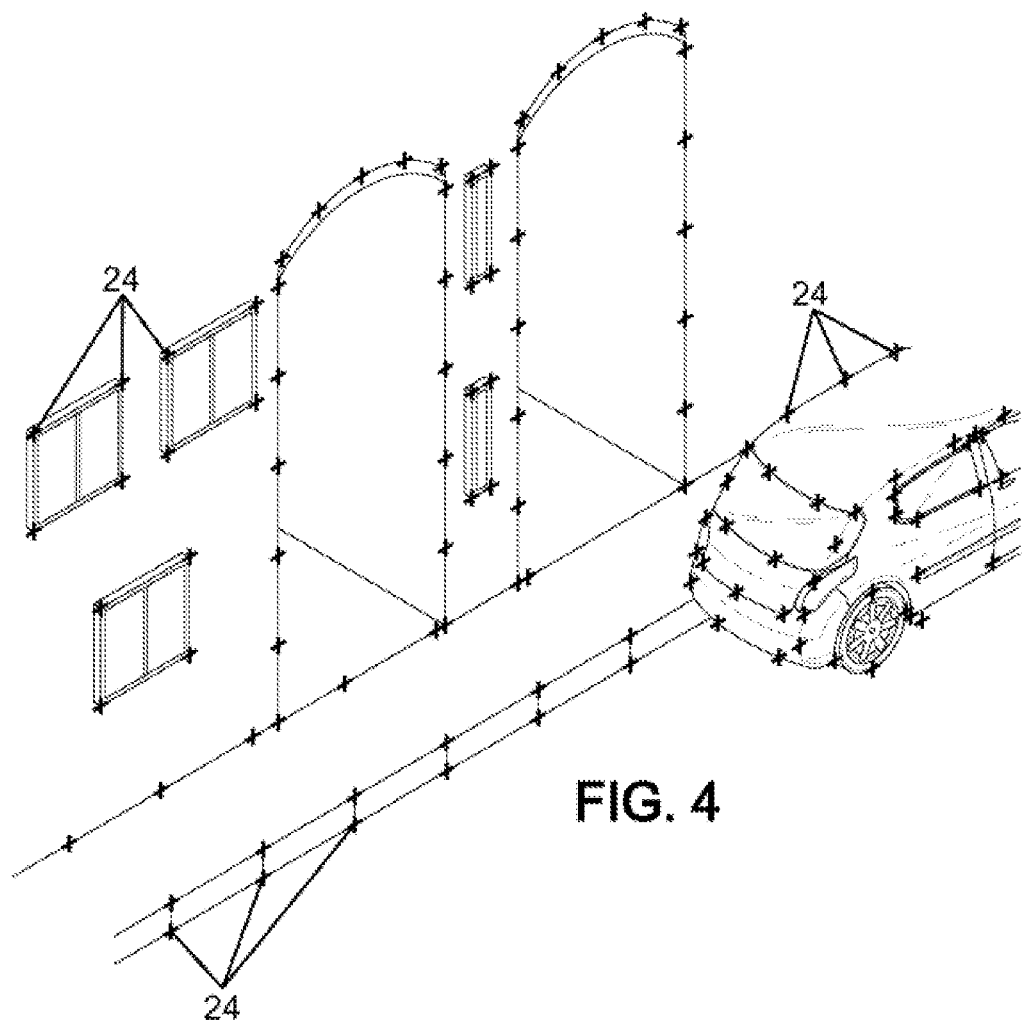
Figure 5A:
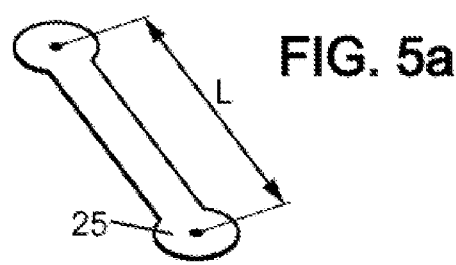
Figure 6A:
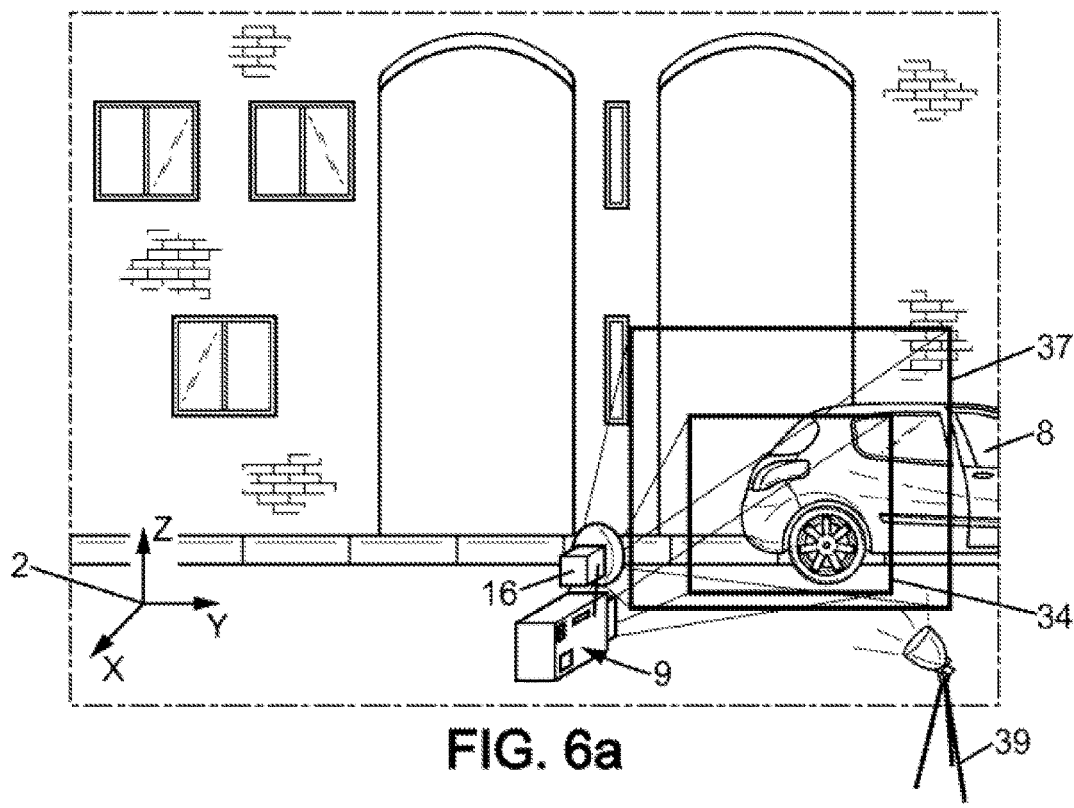
Figure 6B:
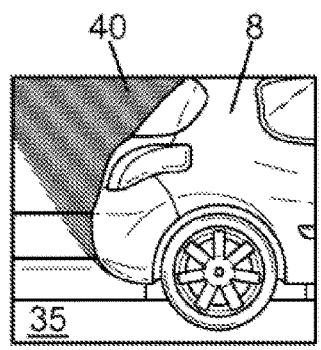
Figure 6C:
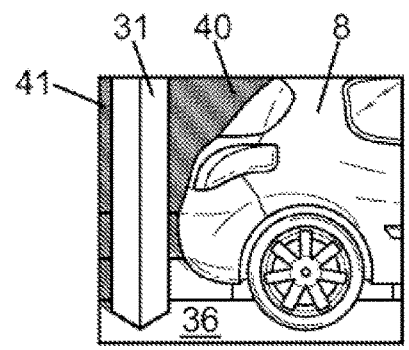
Figure 7A:
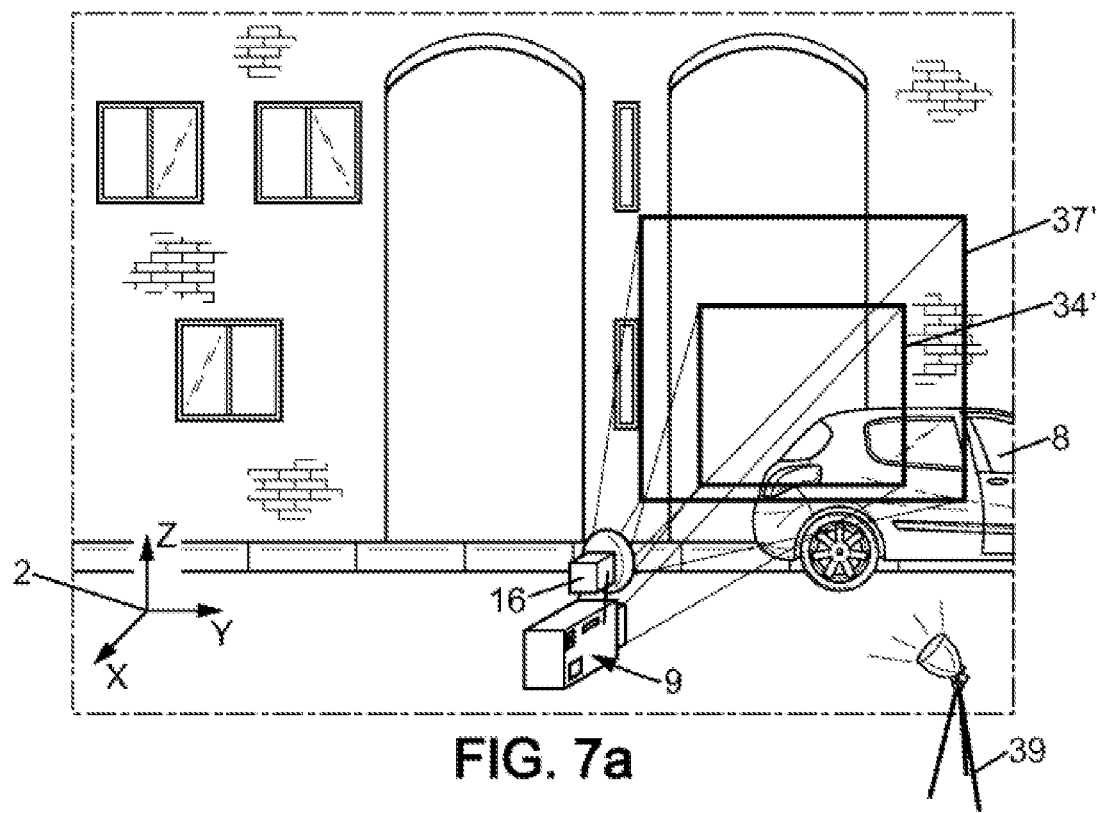
Figure 7B:
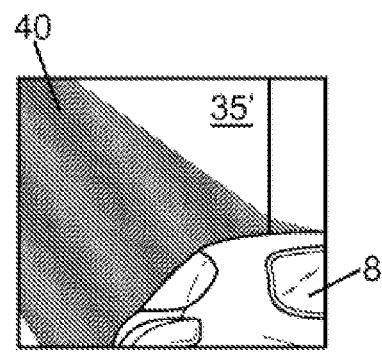
Figure 7C:
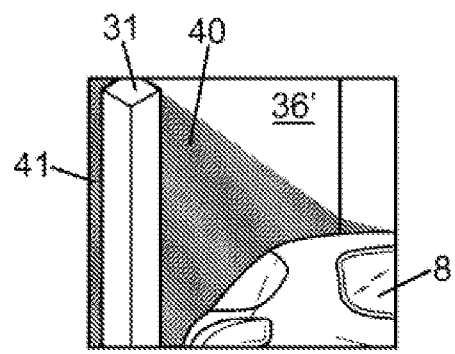
Figure 8:
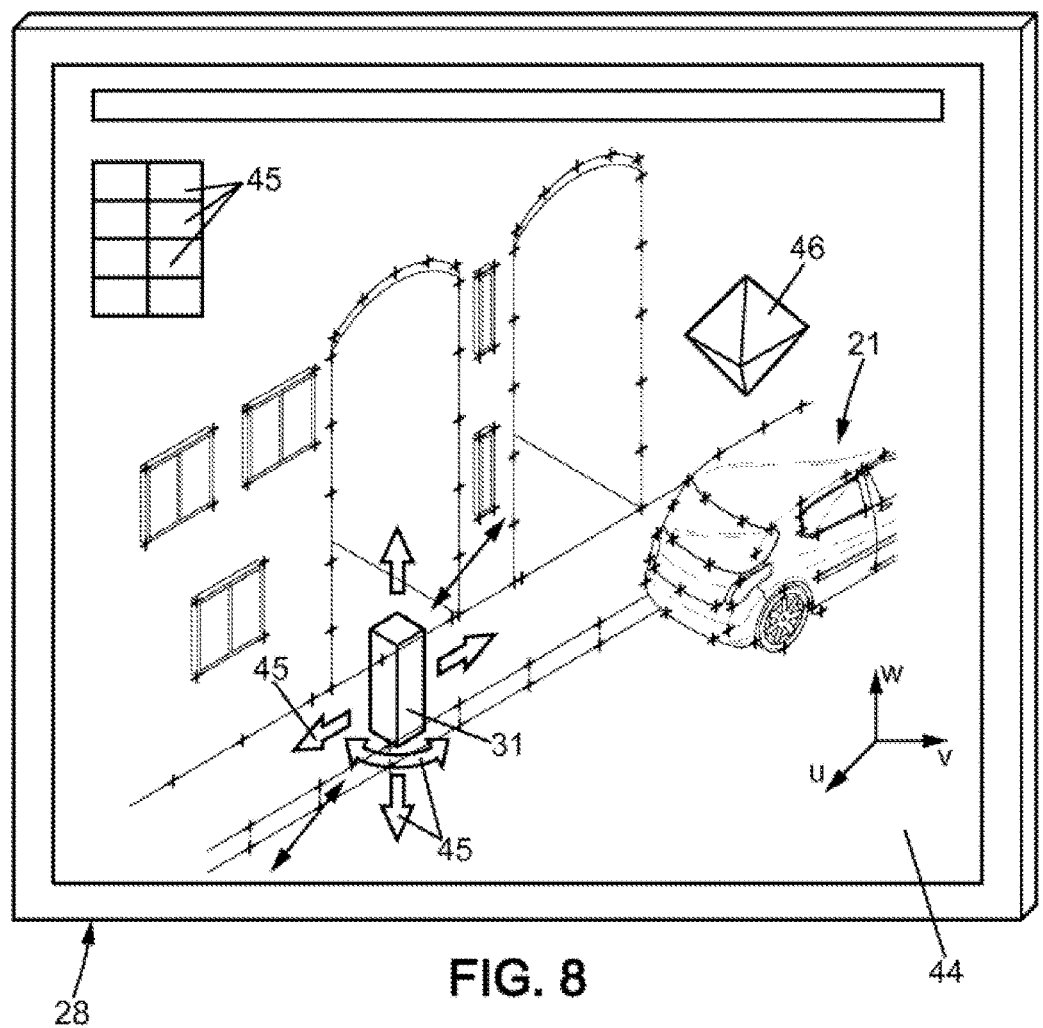
Figure 9:
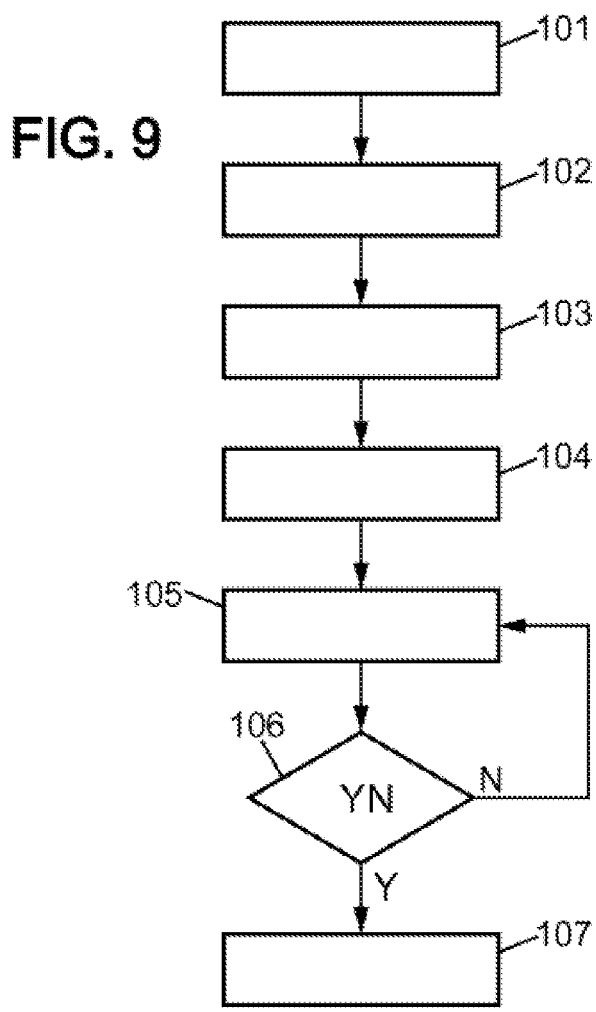

In the drawings:

FIG. 1 is a schematic view of a real space,

FIG. 2 is schematic view of a filming system according to one embodiment of the invention, FIG. 3 is a schematic view representing a use of the system of FIG. 2 in a learning configuration, FIG. 4 is a perspective view of a three-dimensional model, of the real space, FIG. 5 is a view similar to FIG. 2 in a position determination configuration, FIG. 5a is a view similar to FIG. 5 to provide scale, FIG. 6a is a schematic view of the system in the filming configuration, at a first instant, FIG. 6b is a diagram representing an acquisition by the filming camera at the instant shown in FIG. 6a, FIG. 6c is a schematic view of a composite image created on the monitoring screen for that same instant, FIGS. 7a, 7b and 7c respectively correspond to FIGS. 6a, 6b and 6c for a second instant, FIG. 8 is a schematic view of a screen of programmable machine comprising a computerized animation module, FIG. 9 is a flowchart of a process for producing video footage using the objects described above, and FIG. 10 is a schematic view of an acquisition system in a variant embodiment.

In the various figures, the same references are used to designate identical or similar elements.

FIG. 1 schematically illustrates a portion 1 of real space. FIG. 1 shows a very specific example of a real space 1. However, the present invention could be applied to a very large number of different real spaces.

A real reference system 2 is attached to the real space 1, and comprises for example an origin 0, and three mutually perpendicular axes X, Y and Z. Each point in the real space therefore has a unique set of coordinates in the real reference system 2.

In the example provided purely by way of example, the real space 1 is an outdoor space, including a horizontal road 3 extending substantially along the Y axis and a building 4 further back. The building may include various windows 5a, 5b, 5c and doors 6a, 6b, 6c. A sidewalk 7 extends for example between the road 3 and the building 4. There may be a parked car 8 for example.

As a variant, an inside space could be used for the real space, for example a studio. The real space 1 includes a certain amount of natural topographical information. This information relates for example to geometric objects of the real space, such as points, lines, surfaces, and/or volumes. We can for example consider the edges of a structure as lines, and the intersections of two such edges as points. For surfaces, we can consider for example solid surfaces such as a car hood, or else. For the volumes, we can for example refer to objects such as a car or some other object present in the real space. The natural topographical information is thus distinguished from attached calibration landmarks by the fact (s) that:

they are arranged randomly, in a non-ordered manner, they are arranged in a space of infinite dimensions, the whole world, and are not limited to an area equipped with markers, they are highly heterogeneous, not just differing from each other by a code such as a barcode, they are available in a 3D volume, not just in one or more planes, they do not require complicated installation with prior calibration.

We will now refer to FIG. 2 as we describe a system for filming video footage according to one embodiment, in a filming configuration. The video footage is a series of images to be displayed in rapid succession (several frames per second, for example 24 (movie), 25 (PAL), or 30 (NTSC) frames per second) to a spectator. This series of images is for example broadcast or shown as part of a feature film, a television film, an informative message, a video game, or some other form. In particular, the broadcast or showing may occur at a later time than the filming.

This sequence of images recounts an event that takes place in real space 1.

A filming camera 9 of any type typically used to shoot such a scene is used. In particular, a digital camera that can capture several frames per second is used, for example 24 frames per second.

The camera 9 includes a lens 10 that can capture images in a field of view 11, and that is connected to a computer system 12. This connection is made for example using a suitable cable 13, or wirelessly, for example by radio or some other form of transmission.

The filming camera 9 is of any suitable type known, but the invention is particularly suitable if it is possible to vary the field of view 11 during filming. In particular, the field of view 11 can be varied by moving the filming camera 9 within the real space 1. This is especially the case if the filming camera 9 is movable in a guided manner in the real space 1, for example mounted on a rail or a crane with a hinged arm (not shown) defining the possible positions for the filming camera 9.

Alternatively, which is the alternative represented, a filming camera 9 is used that is compact enough to be moved about within the real space 1 by being carried by an operator (not shown).

In one exemplary embodiment, the filming camera 9 includes a monitor 14 mounted on the housing of the camera and having a monitoring screen 15 visible to the filming operator and on which the field of view 11 being captured by the camera is displayed.

The filming system also includes a location pinpointing system comprising a sensor 16 and a computerized pinpointing module 17 of the computer system 12, connected to the sensor 16 wirelessly or by a cable 18, as indicated above.

The sensor 16 has the distinctive feature of having a location with respect to the filming camera 9 that is known at all times. "Location" is understood here to mean that the position and orientation of the sensor 16 with respect to the filming camera 9 are known at all times. This specifically concerns the relative positions and orientations of the acquisition systems of the sensor and camera 9 (CCD array for the camera). This can be achieved, for example, by simply attaching the sensor 16 firmly to the filming camera 9, for example by means of a clamp 19 or some other appropriate mechanical system.

The sensor 16 is characterized in particular by a capture field 20. For example, the sensor 16 can be placed so that no part of the filming camera 9 is blocking any of the capture field 20, and no part of the sensor 16 is blocking any of the field of view 11, as shown in FIG. 2.

The sensor 16 is adapted to capture information relating to the real space 1, in order to determine the position of the sensor 16 in the real space using the computerized pinpointing module 17. In particular, in the filming configuration, it can be arranged so that the location data in the real space 1 is captured with the sensor 16, and the computerized pinpointing module 17 can determine the position of the sensor 16 in the real space, for an acquisition by the sensor 16, using a predetermined three-dimensional model 21 of the real space. Thus, the pinpointing module 17 determines the most likely location of the sensor 16 in the real space, which allows matching the data captured by the sensor 16 to the predetermined three-dimensional model 21 of the real space.

Knowing the position of the sensor 16 in the real space, and knowing the relative position of the filming camera 9 and the sensor 16, the pinpointing module 17 can thus determine the filming camera location data in the real reference system.

Note that although the process described above involves two successive steps of determining the position of the sensor 16 then that of the filming camera 9, alternatively the position of the filming camera 9 could be determined directly without an explicit determination of the location of the sensor 16.

It is planned to use a sensor 16 dedicated to the task of pinpointing the location and having acquisition characteristics that are distinct from the filming camera 9. The filming camera 9 can then be dedicated to its task, which is to film, and the sensor 16 to its own task, which is to determine the position.

As an example, the sensor 16 is an optical sensor. If the sensor 16 is to be mounted on the filming camera 9, a compact optical camera can be provided, for the sensor 16, in particular of a bulk at least two times smaller than the bulk of the filming camera 9. This minimizes the inconvenience for the operator.

The sensor 16 can be chosen in particular to be an optical camera specifically dedicated to pinpointing the position of the filming camera 9 in the real space. It is thus possible, for example, to use an optical camera having an acquisition rate that is at least an integer multiple of that of the filming camera 9, for example on the order of 100 images per second, thereby smoothing when calculating the position of the filming camera 9 in the real space for each time frame.

One can also specifically choose an optical camera with a field of view 20 (a solid angle of view) greater than that of the filming camera 11 in order to maximize the information captured from the real space 1 used to calculate the position of the filming camera. One can for example use a wide angle lens ("fish eye" lens) that has a capture angle exceeding 160 degrees.

One could also use a black and white camera, if necessary, for the pinpointing sensor. The method described here can then work even without capturing color information.

The predetermined three-dimensional model of the real space includes, for example, natural topographical information from the real space 1. It is provided for example using any suitable means. However, as shown in FIGS. 3 and 4, one can for example use some of the elements of the system described above to generate the predetermined three-dimensional model of the real space.

In particular, as shown in FIG. 3, the three-dimensional model 21 is created during a preliminary step in a learning configuration. This step is, for example, carried out shortly before filming, so that the real space during filming corresponds to the pre-established model.

During the learning step, a learning sensor 22 is moved in the real space 1. Over a set of time frames, the learning sensor 22 sends information captured by the learning sensor 22 to the computer system 12, by any appropriate means. The computer system 12 comprises a computerized generation module 23 which, as it receives information from the learning sensor 22 from different angles of view, is able to determine the three-dimensional model 21 (at a scale factor). By thus using the learning sensor 22 to capture the same natural topographical information of the real space 1 from different viewing angles, the generation module 23 is able to determine the three-dimensional position of a set of geometric objects of the real space. The three-dimensional model 21, shown in FIG. 4 as displayed from a different perspective on a computer screen, consists of a set of geometric patterns (points in this case). These points can be represented in any orientation, as shown in FIG. 4, in a perspective view of the real space. In addition to the points 24, the three-dimensional model 21 could also consist of a set of other geometric objects such as straight or curved lines, flat or curved surfaces, volumes, etc., which are determined either by the generation module 23 itself or by assistance from the generation module operator, the operator indicating to the generation module that a set of geometric objects are part of the same line/surface/volume.

As explained above, the three-dimensional model 21 so generated is then imported into the computerized pinpointing module in order to identify the actual position of the filming camera in the real space at all times in the filming configuration.

In the example described, the same sensor 16 that is used in the filming configuration can be used as the learning sensor 22. The same algorithm is then used to determine the three-dimensional position of a geometric object in the real space in the learning configuration, and to determine the position in the real space of the pinpointing camera 16 based on the positions in the real space of the geometric objects determined with the same camera. In addition, by using the same sensor for both steps, one can continue to enrich the three-dimensional model while in the filming configuration, if the model would change while filming (which may be the case if shooting outside or if an actor is present in the field of the sensor 16 in the filming configuration). In this case, the learning mode continues during filming.

As explained above, the predetermined three-dimensional model 21 may optionally be created at a scale factor. In this case, one can for example use a measurement reference 25 of a given length, which is captured with the learning sensor 22, to be used to scale the three-dimensional model 21, as shown in FIG. 5a.

In addition, a positioning configuration can be used to determine the respective location data for the filming camera 9 and for the pinpointing sensor 16 prior to shooting. A particular example is given for the case where the sensor 16 is rigidly attached to the filming camera 9. In the positioning configuration, a positioning pattern 27 is simultaneously filmed by the filming camera 9 and by the sensor 16. The information gathered by the two tools is transmitted to a computerized positioning module 26 suitable for determining their relative position from the images of the same positioning pattern 27 captured by the two tools.

Returning to FIG. 2, the computer system 12 also comprises a computerized animation module 28. This animation module 28 may for example comprise an animation database 29 comprising one or more animations. Each animation includes for example, for each of a set of time frames corresponding to all or part of the duration of the video footage to be filmed, characteristics of three-dimensional objects (point, line, surface, volume, texture, etc.) expressed in a virtual reference system U, V, W 30. Each animation represents, for example, an augmented virtual reality event. For example, the animation database may provide animations depicting a moving or unmoving virtual character, special effects (rain, explosion, etc.), or other animations. For example, a virtual object. 31 is represented in FIG. 2, for a given time frame, characterized by data expressed in the virtual space, their positions in the virtual reference system indicated by U, V, W. The very simple example illustrated uses a vertical column with a square base, fixed over time, but in practice it could be for example a walking lion, etc.

As shown in FIG. 2, lee computer system 12 includes a compositing module 32. The compositing module 32 imports an animation from the animation module 28 along a link 33. If necessary, if the animation is not already expressed in the real reference system 2, the compositing module 32 mathematically connects the virtual U, V, W and real X, Y, Z reference systems a suitable transformation matrix (an example is described further below).

Then, the computerized compositing module 32 generates a composite image, for lee time frame in question, from lee real image captured by the filming camera 9 and from a projection of a virtual image corresponding to the virtual object 31 for the same time frame, the projection being generated according to the filming camera 9 location data in the real reference system. Thus, the composite image includes the superimposed actual image and virtual image, as if the virtual image was the image of an object present in the real space, captured in this time frame by the filming camera 9. The composite image is then displayed on the monitoring screen 15. The filming operator can thus view on his monitoring screen, for each time frame, the position and orientation of the virtual object in real space from his angle of view, as if this virtual object were present in front of him. He can then adapt the position of the filming camera relative to the objects if needed.

As a variant, the computer system 12 also includes a monitoring screen 15' of a monitor 14' which allows the director, or any interested person, to view the composite image from the angle of view of the filming camera, in real time.

A specific example is given in FIGS. 6a to 7c. FIGS. 6a to 6c correspond to a first instant, where an operator (not shown) is filming the portion 34 of the real space corresponding to the rear lower part of the car 8. The image 35 captured by the filming camera 9 at this moment can be seen in FIG. 6b. The position of the filming camera 9 for this time frame is determined by the pinpointing system. As shown in FIG. 6c, the composite image 36 generated on the monitoring screen 15, 15' includes the superimposed real image and virtual object 31 as seen from the capture angle of the filming camera 9. To achieve this, as explained above, because the positions in the real space of the filming camera 9 and of the virtual object 31 are known for that given moment, a projection of this object into the image 35 can be calculated.

FIGS. 7a to 7c represent a later time frame (directly after), and are explained with reference to FIGS. 6a to 6c. The events represented in FIGS. 7a-7c occur about ¹⁄₂₄ second after the preceding figures. During that period of time, the angle of view of the filming camera 9 changed so that the filming camera 9 is now pointing more toward the top of the car 8. The imaged portion 34' is also represented in FIG. 7a. The real image captured by the filming camera 9 is designated by the reference 35' in FIG. 7b. FIG. 7c represents the composite image 36' corresponding no the superimposed real image 35' and virtual object 31, expressed as a function of the location of the filming camera 9 for this time frame. Note that in this example, the virtual object 31 may be identical in both time frames. Its representation projected into the two time frames differs because of the difference in the viewing angle. However, as this is an animation, the virtual object 31 could be slightly different for the two time frames.

The above steps can be repeated in real time for each time frame during filming, and if necessary for multiple filming cameras.

Referring again to FIG. 6a, for the time frame considered, the pinpointing image 37 captured by the sensor 16 may correspond to a larger volume of the real space, and the computerized pinpointing module is suitable for extracting natural topographical information from this pinpointing image 37 and for determining the position of the filming camera 9 in the real reference system 2, as explained above, from this natural topographical information detected and from the three-dimensional model 21. In particular, can eliminate the need for fixed optical markers in the real space 1, providing greater ease of use. Then only natural topographical information is used, which avoids cluttering the filming space with artificial markers. The system described here is compatible with artificial markers, however.

If the field of view of the sensor 16 has just been obstructed (the operator moves during the acquisition) by a real element in the real space, the computerized pinpointing module may offer several options for determining the position of the filming camera 9 in the real space at any time. For example, if the computerized pinpointing model cannot detect sufficient topographical information to determine with certainty the position of the filming camera 9 in the real space, by default it can consider the filming camera 9 as not having moved during that moment. Actually, when the two devices 9 and 16 are very close to one another, as they are in the embodiment shown, if the sensor 16 is unable to determine the topographical information then this means that the field of view of the filming camera 9 is probably blocked by a very close real object. In the next time frame when the sensor 16 is able to determine sufficient topographical information to identify the position of the filming camera 9 in the three-dimensional space, a composite image can once again be generated for this position.

One will note that the computerized pinpointing module includes a selection module suitable for selecting the geometric patterns of the three-dimensional model that are usable for identifying the position of the filming camera in 3D space. First the geometric patterns likely to be within the field of the sensor 16 are selected, for example using an approximate knowledge of the position of the sensor taken from a previous time frame. Then, if in a region of the image captured by the sensor 16, the set of identified geometric patterns in too different from the three-dimensional model, these patterns are not taken into account in determining the position of the filming camera.

Comparing two temporally close images captured by the sensor 16, the geometric patterns present in both images and unmoving in the real space are paired off. The other geometric patterns are considered to be moving in the real space an are not kept for comparison with the three-dimensional model.

As shown in FIG. 2, one can also enhance the computerized pinpointing module in these cases, by adding an inertial sensor 38 suitable for providing the computerized pinpointing module with additional information on the position of the filming camera 9. For example, the inertial sensor 38 is attached to the filming camera 9, or to the sensor 16 if the latter is attached to the filming camera 9. A transformation matrix for converting between the filming camera and sensor is associated with each magnification. In the filming configuration, information from the encoder is used to select the appropriate transformation matrix.

According to one embodiment, as shown in FIGS. 6a-6c, the compositing module 32 may also be adapted to generate a shadow projected by the virtual object 31 in the real space 1. As can be seen for example in FIG. 6a, artificial (as shown) or natural lighting 39 is provided at a known position in the real reference system 2. Thus, as can be seen in FIG. 6b, the real image 35 comprises, in addition to an image of the object 8, an image 40 of its real shadow. As shown in FIG. 6c, the personalized three-dimensional model may contain information about the surface onto which the shadow 41 of the virtual object 31 will be projected, viewed from the viewing angle of the filming camera 9. The shadows of the virtual objects are calculated by taking into account the position in real space of the virtual object 31, and the position in real space of a surface onto which the shadow of the virtual object 31 is projected, the position of the filming camera, and the position, of the lights. The real and virtual shadows are also visible in FIG. 7c.

The system just described is of particular interest when the animation is moved relative to the field of view of the filming camera 9. In one embodiment, in the filming configuration, a static shot of an unmoving real space is filmed, on which an animation will be generated that changes shape over time. It is thus possible to verify that the animation is properly framed during the shoot. Another example consists of moving the filming camera 9 within the real space 1 while incorporating a moving, or possibly still, animation to verify that it is framed as desired during the acquisition.

Returning to FIG. 2, it is also possible for the system to comprise a means of taking into account a change in the focal length of the lens 10 of the filming camera 9.

In the above example, one can consider all operations to have been implemented for a fixed focal length.

Of course, if the focal length is changed while filming, the real images 35 and 35' of FIGS. 6b and 7b will be represented at different levels of magnification. It is thus possible, as shown in FIG. 2, for the zoom 42 on the camera 9 to contain an encoder 43 that allows detecting the degree of rotation of a magnification ring 42, and the computerized pinpointing module 17 takes into account the level of magnification determined by the data transmitted by the encoder 43. This can be done, for example by repeating the location step of FIG. 5, for a plurality of different magnifications of the lens 10 of the filming camera 9.

In the embodiments described above, the virtual object 31 is expressed directly in the real reference system 2 in order to be directly viewable from the viewing angle of the filming camera 9. According to one embodiment, the module for generating the three-dimensional model can be coupled with the animation module 28. Thus the link 33 which is described in relation to FIG. 2 for exporting animations from the animation module 28 to the compositing module 32 can also be used in the other direction, for transmitting the constructed three-dimensional model 21 of the real space to the animation module 28. Thus the virtual object 31 obtained from the animation database and the three-dimensional model. 21 can be superimposed on the screen 44 of the computerized animation module 28, as shown in FIG. 8. This superimposition allows defining the transformation matrix between the virtual U, V. W and real X, Y, Z reference systems in which the virtual object 31 and the three-dimensional model 21 are respectively expressed. It also allows defining or redefining the animation during shooting. The animation module 28 may therefore comprise an application that includes a set of tools, represented by icons 45 on the screen 44, and that allows predefining the animation. It is sufficient to have three-dimensional points generated during the learning step in order to generate the animation directly to prepare for filming in the real space. For example, the wide arrows in FIG. 8 represent commands for moving or resizing the virtual object 31 in the virtual space U, V, W. One can also define a transformation of the virtual object over time between a starting object, indicated by the reference 31, and an ending object, indicated by the reference 46. The deformation between these two representations of the virtual object over time can be configured. The system just described is obviously oversimplified for ease of understanding.

The system just described allows directly modifying the animation when filming in the real space, after acquisition by the system in the learning configuration, which provides increased interaction between the real world and the virtual world.

As is represented very schematically in FIG. 9, in one embodiment the filming system can be used as follows.

In a first step 101, the system is used in an optical calibration configuration in order to determine any optical aberrations of the filming camera 9. This preliminary step is performed for example using a calibration pattern, and the information collected can be subsequently used by the computer system 12 to correct the acquisitions of the filming camera 9.

Then, during step 102, the system is used in a learning configuration, where a learning sensor is moved about within the real space to generate a three-dimensional model of the real space. The three-dimensional model is also scaled.

Next, during step 103, in a positioning configuration, the relative positions of the filming camera 9 and of a pinpointing sensor 16 are determined.

Then, during step 104, an animation is provided from a database of virtual animations. This animation is intended to cooperate with the real space to be filmed.

In step 105, the filming configuration system is used, and a composite image, of the real image obtained by the optical camera 9 and of a projection generated for the same time frame, is generated on a monitoring screen at the filming location, based on the filming camera 9 location data in the real reference system.

In a determination step 106, if the director considers the shot to be satisfactory (arrow Y) based on the composite images generated, he stops shooting the video footage (step 107).

If the determination step 106 shows that the shot is not satisfactory (arrow N), he can take advantage of the fact that all the actors and camera operators are on hand and can shoot the scene again (return to step 105). If necessary, the animation can be changed in this step, as described above in relation to FIG. 8.

The computerized systems described above can be implemented by one or a plurality of programmable machines that can communicate with each other through networks, allowing the possibility of importing animations from remote animation database 29. Computer components such as keyboard, monitor, mouse, CPU, cables, etc. can be of the conventionally known type. In particular, the animation from the animation database may correspond to a simplified animation of the animation that will be present in the final video footage. A few weeks later, in a stage of post-production, the final animation is created from the initial animation used during filming and from the captured footage. The simplified animation contains a smaller volume of data (for example at least two times smaller) than the final animation.

In the same manner as was described in relation to FIGS. 6a-6c for generating a projected shadow of the image of the virtual object in real space, the three-dimensional model, particularly the volumes, can be used to manage objects in the real space and virtual objects covering each other. If it is detected that from the viewing angle of the filming camera, part of the virtual object 31 is located behind an opaque object in the real space as defined in the three-dimensional model, a computerized subtraction module can be used to remove the hidden part or the virtual object 31 from the composite image for that time frame. This is possible using the position in real space of the filming camera, of the virtual, object, and of an opaque object as defined by the three-dimensional model. This way if the operator or the director sees on his monitoring screen 15, 15' that the virtual object 31 will not be visible the way he wants it, he can immediately adjust the Position of the filming camera.

In the above example, FIG. 2 is described as having a sensor 16 and a filming camera 9 with overlapping fields of view and/or acquisition axes that are relatively close to being parallel. However, this is not a requirement, and as a variant the sensor 16 (also known as the witness camera) could for example be filming the ceiling or the floor of the real space, for example, while the optical axis of the filming camera 9 could be approximately horizontal.

Figure 10:
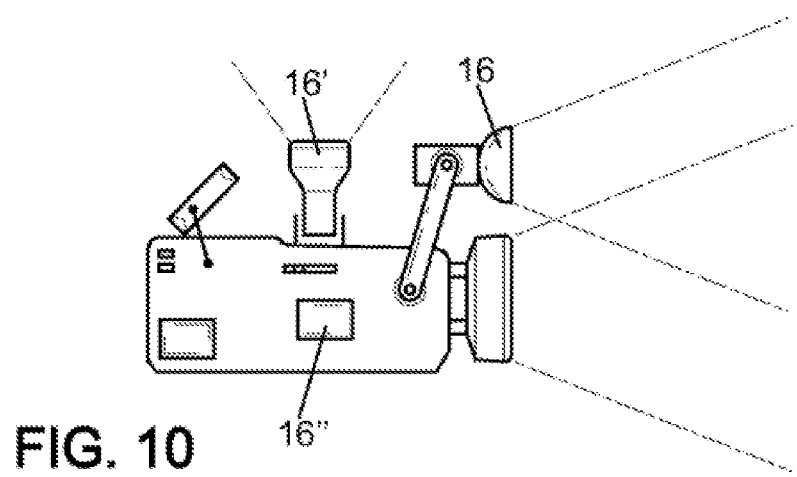

According to one embodiment as shown in FIG. 10, the pinpointing system comprises a second sensor 16' having at least one characteristic that is different from the first sensor 16, selected for example from among the position, orientation, solid angle of view, acquisition frequency, optical axis, and field of view. For example, a second sensor 16' can be facing towards the ceiling, and a third sensor 16" can be facing laterally. Each sensor 16, 16' and 16" sends the natural topographical information that it detects to the computerized pinpointing module. The computerized pinpointing module 17 determines the filming camera 9 location data in the real reference system based on the location data from the sensors 16, 16', 16" (together or separately), and on a comparison between the natural topographical information and the predetermined three-dimensional model 21 of the real space.

The different steps and processes described above appear innovative beyond their use in the general process described, and the Applicant reserves the right to protect them in any suitable manner.

The invention claimed is:
1. System for filming video footage in a real space defined in a real reference system, wherein the system for filming video footage comprises:
   a filming camera, suitable for recording a real image for a plurality of discrete time frames,
   a location pinpointing system, comprising:
     at least one sensor, provided with location data relative to the filming camera that are known for each time frame, and suitable for transmitting to a computerized pinpointing module the natural topographical information of the real space detected by the sensor,
     a second sensor suitable for transmitting to said computerized pinpointing module natural topographical information of the real space detected by said second sensor, and having at least one characteristic that is different from the first sensor, chosen from among the position, the orientation, the solid angle of view, the acquisition frequency, the optical axis, and the field of view,
     a computerized pinpointing module suitable for determining, for each time frame, the filming camera location data in the real reference system based on location data of the sensor, and on a comparison of the natural topographical information and a predetermined three-dimensional model of the real space,
   a monitoring screen,
   a computerized compositing module suitable for generating on the monitoring screen, for each time frame, a composite image of the real image and of a projection of a virtual image taken from a database of virtual animations, said projection generated according to the filming camera location data in the real reference system.

* * * * *